July 26, 1960  W. E. STONE  2,946,276

FOOD HOLDER FOR COOKING FOOD OVER AN OPEN FIRE

Filed June 23, 1959

INVENTOR.
Wallace E. Stone

United States Patent Office 2,946,276
Patented July 26, 1960

2,946,276

FOOD HOLDER FOR COOKING FOOD OVER AN OPEN FIRE

Wallace E. Stone, P.O. Box 1208, Kingman, Ariz., assignor of one-half to O. Ellis Everett, Mohave County, Ariz.

Filed June 23, 1959, Ser. No. 822,368

2 Claims. (Cl. 99—419)

This invention pertains to a food holder for cooking over an open fire.

One of the objects of the invention is to provide a food holder having means for securing food to be cooked over an open fire at one end and a handle at the other end suitable for holding the device and insulating the hand of the user from any overheated part of the device; the holding end of the device having a holder composed of tines spaced apart and with their sharp points reversed and directed toward the handle end of the device.

Still another object is to provide a food holder consisting of a long shank of twisted metal wire which is formed into a holder at one end so that there are reversed prongs adapted to hold food, such as meat, marshmallows, or the like, in a manner so that the user or any other person is extremely unlikely to be injured by the sharp points of the prongs.

Still another object is to provide a food holder for roasting food over an open fire consisting of a long shank made of two strands of wire twisted together and formed to have reversed prongs at the food holding end which are spaced apart so that food may be held not only by piercing it with the prongs, but by compression between these prongs, whereby there is no need for it to be pierced; the shank also holding a handle of insulating material at the end opposite the prongs which may have flat surfaces for printed matter including directions for use.

Other objects will appear hereinafter.

I attain the foregoing objects by means of the device, parts and combinations of parts illustrated in the accompanying drawing in which—

Similar numerals refer to similar parts in the several views.

Figure 1:
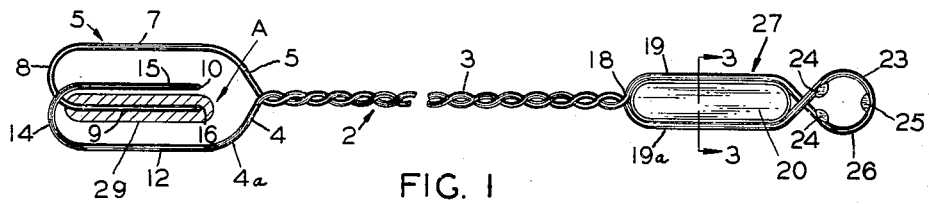
Figure 1 is a plan view of a food holder for roasting foods over an open fire, embodying my invention.

The body 2 of the device consists of a shank 3 made by twisting two strands 4 and 5 of metal wire together. The strands mutually support each other and provide a firm shank that keeps its shape.

At the lower, or outer, end 6 of the device one of the wire strands, 5, is bent outward from the center line of the shank to form a prong holder 7. At 8 this strand wire is bent back upon itself, to form the tine 9. This is sharpened at its end 10 which points inwardly relative to the shank 3. In a similar manner the wire strand 4 is curved outwardly at 4a to form a straight tine holder 12, which is parallel to, but out of alignment with the center of shank 3 and is again bent back upon itself at 14 to form the tine 15 which terminates in the sharp point 16. The back bends 8 and 14 cross, one over the other, so that the tines 9 and 15 overlap each other, and define the food holding area A.

At the opposite end of the shank the strands are separated at 18 and form the outwardly spaced, but parallel, supports 19 and 19a which form an elongated handle loop and enclose the side edges of the insulated handle 20. Grooves 21 are formed in the edges of the handle to retain the straight portions of strand wire 19 and 19a.

At the extreme inner end of body 2 the wire strands 19 and 19a are crossed and formed into a circular loop 23. This is of a size such that tabs 24 pressed from the inner surface of the wire of the loop 23 will engage the underlip of a bottle cap on a beverage bottle; thus the inner end of the handle body 2 may be used as a bottle opener. Tab 25 is for the same purpose and may be used to grip the under edge of the lip of a beverage bottle cap while the body 26 of the loop 23 extends across the top face of the cap.

Figure 2:
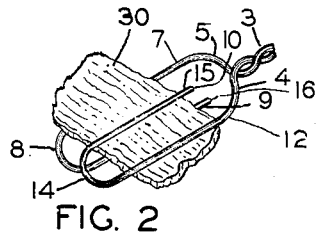
Figure 2 is a perspective view of the food holder end of the device.
Figure 3:
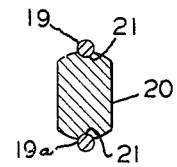
Figure 3 is a section taken substantially on line 3—3 of Figure 1.
Figure 4:
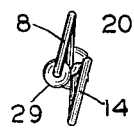
Figure 4 is an end elevational view of the food holding end of the device.

Food such as sausage 29 to be roasted may be pierced by either one of the tines 9 or 15 and will be then securely held, as by a spit, while the user grips the handle at end 27 of body 2. When this is done there is no chance for anyone to be pierced, stuck or injured by contact with the sharpened ends 10 and 16 of the tines 9 and 15 because they are directed inwardly from end 6 and toward handle end 27. Should food be of greater size than sausage 29, so that it cannot be easily pierced by tines 9 or 15, such as, for example, steak, marked 30, Figure 2, it may be gripped by compression between the tines 9 and 15 and the tine holders 7 and 12 hold it flat as shown in Figure 2. Otherwise, food such as marshmallows may be held between the tines by compression.

From the foregoing it will be observed that I have provided a holder for food to be roasted which is quickly and easily made at a minimum cost and with a minimum of parts. Since the structure herein disclosed may be subject to wide variation to accomplish the purposes desired, I wish to be limited only by the following claims.

I claim:

1. A food holder for roasting foods over an open fire consisting of a length of wire formed into an elongated loop at one end adapted to hold a handle and providing strands, said strands being twisted together to form a shank extending from said elongated handle loop to an outer tine supporting end, and thence spread apart to form laterally disposed tine supports; said tine supports being bent back upon themselves by inwardly directed back bends to provide food holding tines having sharpened ends directed toward the said handle holding loop, and said back bends being crossed so that the back bent portions of said tines are resiliently held in position one over the other to provide food holding elements compressively disposed relative to the laterally disposed portions of said tines.

2. A food holder for roasting foods over an open fire consisting of a length of wire formed into an elongated loop at one end adapted to hold a handle and providing strands, said strands being twisted together to form a shank extending from said handle loop to an outer tine supporting end, and thence spread apart to form tine supports; said tine supports having back bends forming tines with their ends directed toward said handle, and with the said back bends disposed in crossed position to position the tines in overlapping relation, and resiliently urged toward each other.

References Cited in the file of this patent

UNITED STATES PATENTS

| | | |
|---|---|---|
| 99,971 | Taylor et al. | Feb. 10, 1870 |
| 2,161,512 | Haislip | June 6, 1939 |
| 2,479,324 | Dawson | Aug. 16, 1949 |
| 2,479,533 | Woodbury | Aug. 16, 1949 |
| 2,608,928 | McDonnell | Sept. 2, 1952 |
| 2,649,042 | Wickman | Aug. 18, 1953 |
| 2,706,446 | Lockey | Apr. 19, 1955 |
| 2,811,099 | McGoldrick | Oct. 29, 1957 |
| 2,915,960 | McClellan | Dec. 8, 1959 |

FOREIGN PATENTS

| | | |
|---|---|---|
| 172,260 | Great Britain | Dec. 8, 1921 |